United States Patent
Kim et al.

(10) Patent No.: US 7,333,544 B2
(45) Date of Patent: Feb. 19, 2008

(54) LOSSLESS IMAGE ENCODING/DECODING METHOD AND APPARATUS USING INTER-COLOR PLANE PREDICTION

(75) Inventors: Woo-shik Kim, Yongin-si (KR); Dae-sung Cho, Seoul (KR); Hyun Mun Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 734 days.

(21) Appl. No.: 10/892,248

(22) Filed: Jul. 16, 2004

(65) Prior Publication Data

US 2005/0013370 A1    Jan. 20, 2005

(30) Foreign Application Priority Data

Jul. 16, 2003  (KR) ............... 10-2003-0048667
Jul. 16, 2004  (KR) ............... 10-2004-0055370

(51) Int. Cl.
- *H04B 1/66* (2006.01)
- *H04N 1/413* (2006.01)
- *G06K 9/36* (2006.01)

(52) U.S. Cl. ............ 375/240.16; 382/244; 358/426.13; 348/402.1

(58) Field of Classification Search ........... 375/240.16; 382/244; 358/426.13; 348/401.1, 402.1, 348/409.1, 410.1, 411.1

See application file for complete search history.

(56) References Cited

U.S. PATENT DOCUMENTS 6,498,111 B1 *  12/2002  Kapolnek et al. ........... 438/762
6,510,177 B1 *  1/2003  De Bonet et al. ....... 375/240.16
2003/0035478 A1 *  2/2003  Taubman ............... 375/240.11

OTHER PUBLICATIONS

Ming-feng et al.,"Lossess video compression using combination of temporal and spatial prediction," IEEE, Int. Conf. Neural Networks & Signal Processing, Dec. 2003, pp. 1193-1196.*

Kobayahshi M. et al., "Lossless Compression For RGB Color Still Images" Image Processing, 1999. ICIP 99. Proceedings. 1999 International Conference on Kobe, Japan Oct. 24-28, 1999, Piscataway, NJ, USA, IEEE, US, vol. 4, Oct. 24, 1999 pp. 73-77, XP 010368688, ISBN: 0-7803-5467-2 Abstract, p. 73, col. 1—p. 75, col. 1.

(Continued)

*Primary Examiner*—Kevin Kim
(74) *Attorney, Agent, or Firm*—Staas & Halsey LLP

(57) ABSTRACT

A lossless image encoding/decoding method and apparatus. The lossless color image encoding apparatus includes a motion prediction image generator estimating a motion between a previous image and a current image and outputting a corresponding prediction image, a residue generator generating a temporal residue corresponding to a difference between a prediction image generated by the motion prediction image generator and the corresponding block of the current image with respect to different components of the color image, a prediction residue generator generating prediction residues by defining a linear-transformed value of one residue among the different components of the color image output from the residue generator as a predictor and using differences between each of the residues of the other components and the predictor, and an entropy encoder receiving the residue forming the predictor from the residue generator and the prediction residues from the prediction residue generator and generating a bitstream. Encoding methods, decoding apparatuses, and decoding methods can be implemented similarly.

56 Claims, 6 Drawing Sheets

OTHER PUBLICATIONS

Goffman-Vinopal L. et al., "Color Image Compression Using Intercolor Correlation", Proceedings 2002 International Conference On Image Processing. ICIP 2002. Rochester, NY, Sep. 22-25, 2002, International Conference on Image Processing, New York, NY: vol. 2 of 3, Sep. 22, 2002, pp. 353-356, XP010607981 ISBN:0-7803-7622-6 p. 353, col. 1—p. 354, col. 2.

European Search Report issued Jul. 6, 2006 in European Application No. 04254271.2-2223.

* cited by examiner

FIG. 5
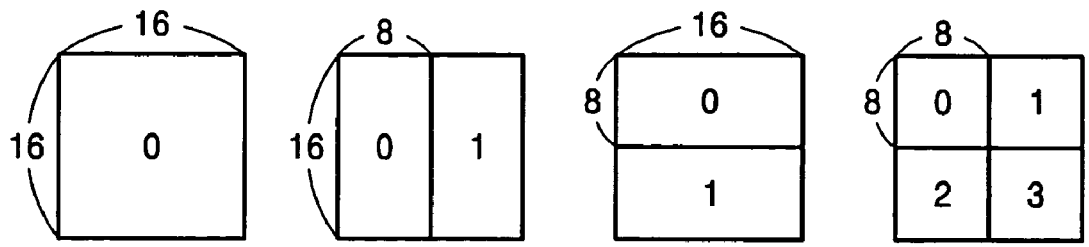
MACRO BLOCK DIVIDING : 16x16, 16x8, 8x16, 8x8
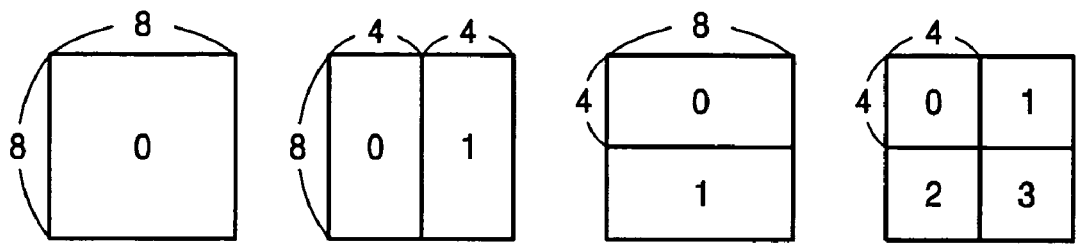
8x8 BLOCK DIVIDING : 8x8, 8x4, 4x8, 4x4
FIG. 6A
| $P_0$ | $P_1$ | $P_2$ | $P_3$ | $P_4$ | $P_9$ | $P_{10}$ | $P_{11}$ | $P_{12}$ |
|---|---|---|---|---|---|---|---|---|
| $P_5$ | $P_a$ | $P_b$ | $P_c$ | $P_d$ | | | | |
| $P_6$ | $P_e$ | $P_f$ | $P_g$ | $P_h$ | | | | |
| $P_7$ | $P_i$ | $P_j$ | $P_k$ | $P_l$ | | | | |
| $P_8$ | $P_m$ | $P_n$ | $P_o$ | $P_q$ | | | | |

LOSSLESS IMAGE ENCODING/DECODING METHOD AND APPARATUS USING INTER-COLOR PLANE PREDICTION

CROSS-REFERENCE TO RELATED APPLICATIONS

This application claims the priority benefit of Korean Patent Application Nos. 2003-48667 and 2004-55370, filed on Jul. 16, 2003 and Jul. 16, 2004, respectively, in the Korean Intellectual Property Office, the disclosures of which are incorporated herein in their entirety by reference.

BACKGROUND OF THE INVENTION

1. Field of the Invention

The present invention relates to a lossless image encoding/decoding method and apparatus, and more particularly, to a lossless image encoding/decoding method and apparatus, using inter-color plane prediction, which encode a color image by effectively removing duplicate information between color plane components and decode the encoded color image.

2. Description of the Related Art

An RGB coordinate system is a basic color coordinate system. In a conventional color image compression method, color image compression is accomplished by independently performing a prediction encoding process in each plane for each color component in an image. However, since correlations among the color components cannot be used, encoding efficiency drops. A representative conventional compression method in this respect is presented in the H.264/MPEG-4 pt.10 AVC standard technology ("Text of ISO/IEC FDIS 14496-10: Information Technology—Coding of audio-visual objects—Part 10: Advanced Video Coding", ISO/IEC JTC 1/SC 29/WG 11, N5555, March, 2003), which has been developed by Joint Video Team (JVT) of the ISO/IEC MPEG and ITU-T VCEG groups. In this standard technology, when a moving picture is compressed, spatial prediction or motion prediction is performed considering each color component independently.

SUMMARY OF THE INVENTION

The present invention provides a lossless image encoding/decoding method and apparatus using inter-color plane prediction, which can raise compression efficiency by performing motion or spatial prediction encoding, performing prediction encoding between residues of color image components, and performing lossless compression of the color image components without transforming and quantizing processes.

Additional aspects and/or advantages of the invention will be set forth in part in the description which follows and, in part, will be obvious from the description, or may be learned by practice of the invention.

To achieve the above and/or additional aspects and advantages, embodiments of the present invention include a lossless image encoding apparatus, which losslessly encodes a color image using residue prediction between different color image components, including a motion prediction image generator estimating motion between a previous image and a current image in units of predetermined sized blocks and outputting a prediction image, a residue generator generating a temporal residue corresponding to a difference between the prediction image and a corresponding block of the current image with respect to different components of the current image, a prediction residue generator generating prediction residues by defining a linear-transformed value of one residue, of the different components, output from the residue generator as a predictor residue and using respective differences between residues of other components, of the different components, and the predictor residue, and an entropy encoder receiving the predictor residue and prediction residues and generating a bitstream by entropy encoding the predictor residue and the prediction residues.

To achieve the above and/or additional aspects and advantages, embodiments of the present invention may further include a lossless image encoding apparatus, which losslessly encodes a color image using residue prediction between different color image components, including a spatial prediction image generator estimating a prediction direction from pixels spatially close to a pixel block of a current image and outputting a prediction image, a residue generator generating a spatial residue corresponding to a difference between the prediction image and the pixel block of the current image with respect to each of different components of the current image, a prediction residue generator generating prediction residues by defining a linear-transformed value of one residue, of the different components, output from the residue generator as a predictor residue and using respective differences between residues of other components, of the different components, and the predictor residue, and an entropy encoder receiving the predictor residue and the prediction residues and generating a bitstream by entropy encoding the predictor residue and the prediction residues.

To achieve the above and/or additional aspects and advantages, embodiments of the present invention may further include a lossless image encoding apparatus, which losslessly encodes a color image using residue prediction between different color image components, including a motion prediction image generator estimating motion between a previous image and a current image in units of predetermined sized blocks and outputting a first prediction image, a spatial prediction image generator estimating a prediction direction from pixels spatially close to a pixel block of the current image and outputting a second prediction image, a residue generator generating a temporal residue corresponding to a difference between the first prediction image generated by the motion prediction image generator and a corresponding block of the current image in an inter prediction mode, or generating a spatial residue corresponding to a difference between the second prediction image generated by the spatial prediction image generator and the pixel block of the current image in an intra prediction mode, a prediction residue generator receiving the temporal residue in the inter prediction mode or the spatial residue in the intra prediction mode from the residue generator and generating prediction residues by defining a linear-transformed value of one residue for a component, of different components of the current image, as a predictor residue and using respective differences between residues of other components, of the different components, and the predictor residue, and an entropy encoder receiving the predictor residue and the prediction residues and generating a bitstream by entropy encoding the predictor residue and the prediction residues.

To achieve the above and/or additional aspects and advantages, embodiments of the present invention include a lossless image encoding method, which losslessly encodes a color image using residue prediction between different color image components, the method including estimating motion between a previous image and a current image in units of predetermined sized blocks and outputting a prediction image, generating a temporal residue corresponding to a difference between the prediction image and a corresponding block of the current image with respect to different components of the current image, generating prediction residues by defining a linear-transformed value of one residue, of the different components, output from the generating of the temporal residue, as a predictor residue and using respective differences between temporal residues of other components, of the different components, and the predictor residue, and generating a bitstream by entropy encoding the predictor residue and the generated prediction residues of the other components.

To achieve the above and/or additional aspects and advantages, embodiments of the present invention may include a lossless image encoding method, which losslessly encodes a color image using residue prediction between different color image components, the method including estimating a prediction direction from pixels spatially close to a pixel block of a current image and outputting a prediction image, generating a spatial residue corresponding to a difference between the prediction image and the pixel block of the current image with respect to different components of the current image, generating prediction residues by defining a linear-transformed value of one residue, of the different components, output from the generating of the spatial residue, as a predictor residue and using respective differences between temporal residues of other components, of the different components, and the predictor residue, and generating a bitstream by entropy encoding the predictor residue and the prediction residues of the other components.

To achieve the above and/or additional aspects and advantages, embodiments of the present invention still further may include a lossless image encoding method, which losslessly encodes a color image using residue prediction between different color image components, the method including determining whether an encoding mode is an inter prediction mode or an intra prediction mode.

If the encoding mode is determined to be an inter prediction mode, then estimating a motion between a previous image and a current image in units of predetermined sized blocks and outputting a first prediction image, generating a temporal residue corresponding to a difference between the first prediction image and a corresponding block of the current image with respect to different components of the current image, first generating first prediction residues by defining a first linear-transformed value of a first residue, of the different components, output from the generating of the temporal residue, as a predictor residue and using respective differences between temporal residues of other components, of the different components, and the predictor residue, and firstly generating a bitstream by entropy encoding the predictor residue and the first prediction residues of the other components.

If it is determined that the encoding mode is an intra prediction mode, estimating a prediction direction from pixels spatially close to a pixel block of the current image and outputting a second prediction image, generating a spatial residue corresponding to a difference between the second prediction image and the pixel block of the current image with respect to different components of the current image, secondly generating second prediction residues by defining a second linear-transformed value of a second residue, of the different components, output from the generating of the spatial residue, as the predictor residue and using respective differences between temporal residues of other components, of the different components, and the predictor residue, and secondly generating a bitstream by entropy encoding the predictor residue and the second prediction residues of the other components.

To achieve the above and/or additional aspects and advantages, embodiments of the present invention include a lossless image decoding apparatus, which decodes a losslessly encoded color image, including a motion compensation unit generating a temporally motion compensated prediction image, an entropy decoder generating a restored predictor residue of a predictor component, from different components of the encoded color image, defined as a predictor residue at an upstream corresponding lossless image encoding apparatus, and restored prediction residues of other components, of the different components and different from the predictor component, when decoding a bitstream of the encoded color image, a prediction residue compensation unit generating restored residues for the other components by adding the restored prediction residues to a value that is acquired by a linear-transform of the restored predictor residue, and an original image generator generating an original image by adding the temporally motion compensated prediction image to the restored residues of the other components and the restored predictor residue of the predictor component.

To achieve the above and/or additional aspects and advantages, embodiments of the present invention may include a lossless image decoding apparatus, which decodes a losslessly encoded color image, including a spatial prediction unit generating a prediction image obtained by estimating a prediction direction from spatially adjacent pixels, an entropy decoder generating a restored predictor residue of a predictor component, from different components of the encoded color image, defined as a predictor residue at an upstream corresponding lossless image encoding apparatus, and restored prediction residues of the other components, of the different components and different from the predictor component, when decoding a bitstream of the encoded color image, a prediction residue compensation unit generating restored residues for the other components by adding the restored prediction residues to a value that is acquired by a linear-transform of the restored predictor residue, and an original image generator generating an original image by adding the prediction image to the restored residues of the other components and the restored predictor residue of the predictor component.

To achieve the above and/or additional aspects and advantages, embodiments of the present invention include a lossless image decoding apparatus, which decodes a losslessly encoded color image, including a spatial prediction unit generating a prediction image obtained by estimating a prediction direction from spatially adjacent pixels, a motion compensation unit generating a temporally motion compensated prediction image, an entropy decoder generating a restored predictor residue of a predictor component, from different components of the encoded color image, defined as a predictor residue at an upstream corresponding lossless image encoding apparatus, and restored prediction residues of other components, of the different components and different from the predictor component, when decoding a bitstream of the encoded color image, a prediction residue compensation unit generating restored residues of the other components by adding the restored prediction residues to a value that is acquired by a linear-transform of the restored predictor residue, and an original image generator generating an original image by adding the restored residues of the other components and the restored predictor residue to the temporally motion compensated prediction image generated by the motion compensation unit in an inter prediction mode or to the prediction image generated by the spatial prediction unit in an intra prediction mode.

To achieve the above and/or additional aspects and advantages, embodiments of the present invention include a lossless image decoding method, the method including generating a temporally motion compensated prediction image, generating a restored predictor residue of a predictor component, from different components of an encoded color image, and restored prediction residues of other components, of the different components and different from the predictor component, when decoding a bitstream of the encoded color image, linear-transforming the restored predictor residue, generating restored residues of the other components, by adding the restored prediction residues of the other components to an output value of the linear-transforming of the restored predictor residue, and generating an original image by adding the temporally motion compensated prediction image to the restored residues of the other components and the restored predictor residue.

To achieve the above and/or additional aspects and advantages, embodiments of the present invention may further include a lossless image decoding method, which decodes a losslessly encoded color image, the method including generating a prediction image obtained by estimating a prediction direction from spatially adjacent pixels, generating a restored predictor residue of a predictor component, from different components of an encoded color image, and restored prediction residues of other components, of the different components and different from the predictor component, when decoding a bitstream of the encoded color image, linear-transforming the restored predictor residue, generating restored residues of the other components, by adding the restored prediction residues of the other components to an output value of the linear-transforming of the restored predictor residue, and generating an original image by adding the prediction image to the restored residues of the other components and the restored predictor residue.

To achieve the above and/or additional aspects and advantages, embodiments of the present invention may still further include a lossless image decoding method, the method including determining whether an encoding mode for an encoded color image is an inter prediction mode or an intra prediction mode.

If the encoding mode is determined to be an inter prediction mode, generating a temporally motion compensated prediction image, firstly generating a restored predictor residue of a predictor component, from different components of the encoded color image, and restored prediction residues of other components, of the different components and different from the predictor component, when decoding a bitstream of the encoded color image, firstly linear-transforming the restored predictor residue, firstly generating first restored residues of the other components, by adding the restored prediction residues of the other components to an output value of the first linear-transforming of the restored predictor residue, and firstly generating an original image by adding the temporally motion compensated prediction image to the first restored residues of the other components and the restored predictor residue.

If the encoding mode is determined to be an intra prediction mode, generating a prediction image obtained by estimating a prediction direction from spatially adjacent pixels, secondly generating the restored predictor residue of the predictor component and restored prediction residues of the other components, when decoding a bitstream of the encoded color image, secondly linear-transforming the restored predictor residue, secondly generating second restored residues of the other components, by adding the restored prediction residues of the other components to an output value of the secondly linear-transforming of the restored predictor residue, and secondly generating the original image by adding the prediction image to the second restored residues generated in the secondly generating of the second restored residues of the other components and the restored predictor residue generated in the secondly generating of the restored residue.

Lastly, to achieve the above and/or additional aspects and advantages, embodiments of the present invention include a computer readable medium comprising computer readable code for controlling the above methods and apparatus.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 illustrates a method of dividing a macro block for temporal prediction;

FIG. 6A illustrates positions of adjacent pixels for spatial prediction and pixel positions of a current block to be predicted;

DETAILED DESCRIPTION OF THE PREFERRED EMBODIMENTS

Figure 1:
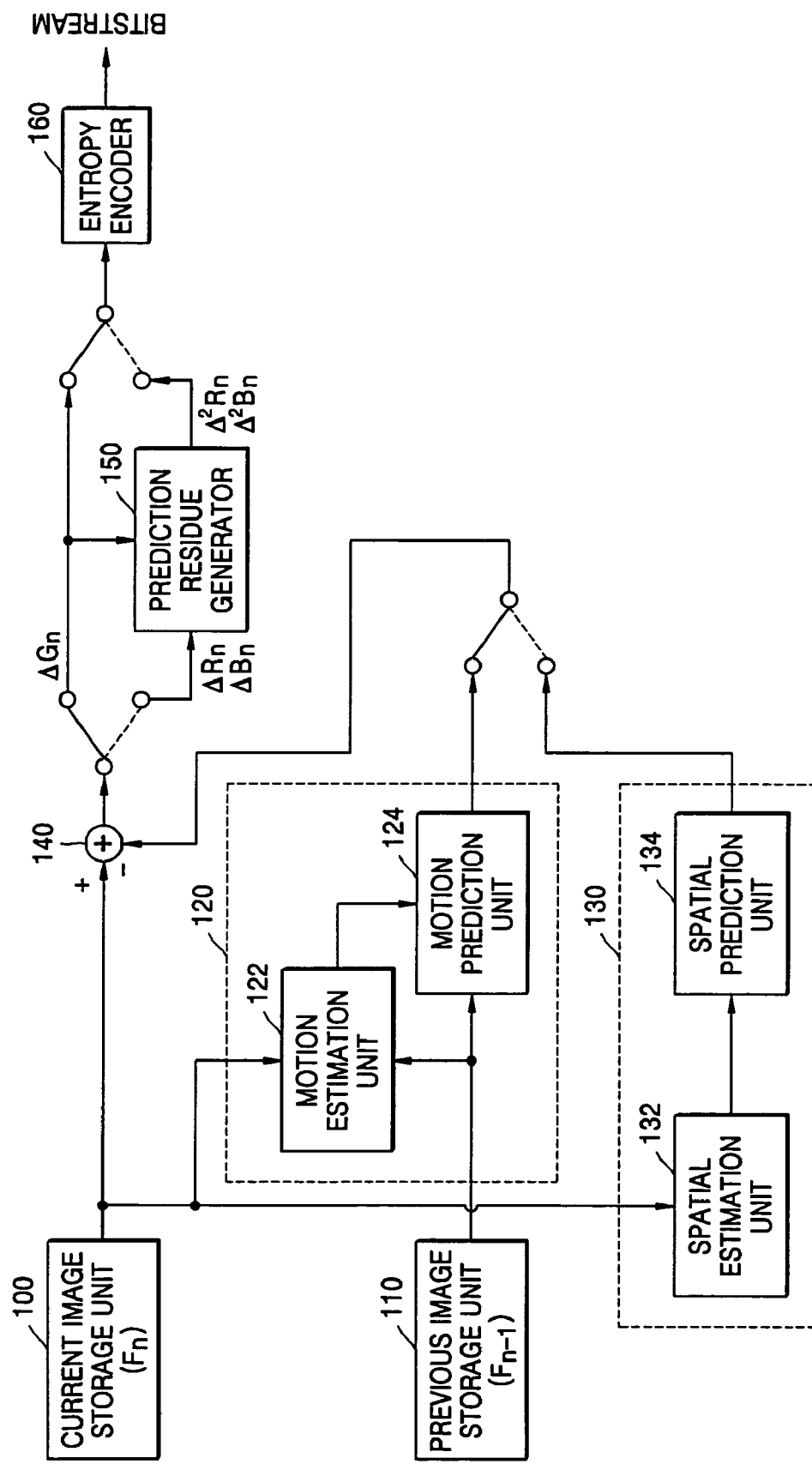
FIG. 1 is a block diagram of a lossless image encoding apparatus, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a lossless image encoding apparatus according to an embodiment of the present invention. In this lossless image encoding apparatus, a color image including green (G), red (R), and blue (B) components is encoded.

Referring to FIG. 1, the lossless image encoding apparatus includes a current image storage unit $F_n$ 100, a previous image storage unit $F_{n-1}$ 110, a motion prediction (MP) image generator 120, a spatial prediction (SP) image generator 130, a residue generator 140, a prediction residue generator 150, and an entropy encoder 160. Also, the lossless image encoding apparatus can further include a mode determining unit (not shown) determining whether encoding has been performed in an inter prediction mode or an intra prediction mode.

The current image storage unit 100 receives and stores a current color image including R-G-B components. The previous image storage unit 110 receives and stores a previous color image including R-G-B components of the current color image.

The MP image generator 120, which includes a motion estimation (ME) unit 122 and an MP unit 124, estimates motion between a current image and a previous image in units of blocks and outputs a corresponding block. A block is basically a 16×16 macro block, as illustrated in FIG. 5, and the MP image generator 120 divides the macro block into blocks with various sizes such as 16×16, 16×8, 8×16, and 8×8, calculates a motion vector of each block, and predicts a temporal image value. Fine motion can be sensed by dividing a 8×8 block into blocks with various sizes such as 8×8, 8×4, 4×8, and 4×4 again.

The ME unit 122 estimates motion between a current image and a previous image in units of blocks. The MP unit 124 outputs a block corresponding to a motion vector generated by the ME unit 122.

The SP image generator 130, which includes a spatial estimation (SE) unit 132 and an SP unit 134, estimates a prediction direction from pixels spatially close to a pixel block of the current image and outputs a corresponding block.

The SE unit 132 estimates a prediction direction from pixels spatially close to a pixel block of the current image. The SP unit 134 outputs a block corresponding to a direction estimated by the SE unit 132. The SE unit 132 and the SP unit 134 will be further described below in the discussion of FIGS. 6A-6B.

The residue generator 140 generates a temporal residue corresponding to a difference between a block output from the MP image generator 120 and a corresponding block of the current image in the inter prediction mode, or generates a spatial residue corresponding to a difference between a block output from the SP image generator 130 and a corresponding block of the current image in the intra prediction mode.

The prediction residue generator 150 generates prediction residues $\Delta^2 R_n$ and $\Delta^2 B_n$ of the R-B components from differences between a value of a residue $\Delta G_n$, of the G component being transformed and each of the residues $\Delta R_n$ and $\Delta B_n$, of the R-B components generated by the residue generator 140.

The prediction residue generator 150 performs a linear transformation on the residue $\Delta G_n$, of the G component. The linearly transformed value also includes the residue value of the G component. The linear transformation on the residue of the G component is performed using correlations among components (R, G, and B components in the present embodiment) forming the original image. In detail, the linear transformation is performed by multiplying the residue $\Delta G_n$, of the G component by constant values a and c and adding the result value to offsets b and d. The values a, b, c, and d are determined by Equation 4 through 9, which will be described thoroughly below.

Signals output from the residue generator 140 and the prediction residue generator 150 are entropy encoded by the entropy encoder 160 and output as a bitstream.

This embodiment will now be described in greater detail.

The current image storage unit 100 of the lossless image encoding apparatus uses an R-G-B image. The image is handled in units of blocks in the image encoding apparatus.

The image encoding apparatus predicts an image using the inter prediction mode and the intra prediction mode in order to raise encoding efficiency. In the inter prediction mode, the MP image generator 120 is used, including the ME unit 122 and the MP unit 124, and predicts the image by estimating motion from the previous image storage unit 110. In the intra prediction mode, the SP image generator 130 is used, including the SE unit 132 and the SP unit 134, and predicts the image from a spatially adjacent block.

First, a residue between an input image and an image predicted by the MP image generator 120 or the SP image generator 130 is generated by the residue generator 140. The residues of the three components R, G, and B are obtained by the residue generator 140, respectively. To use correlations among the R-G-B components, the prediction residue generator 150 is then used.

A residue $\Delta G_n$, of the G component of the three components is entropy encoded in the entropy encoder 160 and output as a bitstream. Residue $\Delta R_n$ and $\Delta B_n$, of the other two components of R and B are encoded using the residue $\Delta G_n$, of the G component, not yet directly entropy encoded. In more detail, the prediction residue $\Delta^2 B_n$, of the B component and the prediction residue $\Delta^2 R_n$, of the R component are generated by the prediction residue generator 150. The prediction residues $\Delta^2 B_n$ and $\Delta^2 R_n$ of R-B components are generated by subtracting a value obtained by linearly transforming the residue $\Delta G_n$, of the G component from residues $\Delta B_n$ and $\Delta R_n$ of the R-B components generated by the residue generator 140. In the value obtained by linear transforming the residue $\Delta G_n$ of the G component, the residue $\Delta G_n$ of the G component is also included. The generated prediction residues $\Delta^2 B_n$ and $\Delta^2 R_n$ of the R-B components are then entropy encoded by the entropy encoder 160 and output as a bitstream.

In this lossless image method and apparatus using inter-color plane prediction, described above, the components are input in order of G, R and B, and an image is encoded by obtaining the residue of the G component, first, and then the prediction residues of the R-B components. However, the encoding method is effective when the G component makes up most of the image information to be encoded. Therefore, when the R component makes up most of the image information to be encoded, that is, when the R component is the dominant component, in embodiments of the present invention, a residue of the R component is obtained, and prediction residues of the G-B components can be obtained using the residue of the R component. Likewise, when the B component is the dominant component, a residue of the B component is obtained, and prediction residues of the R-G components can be obtained using the residue of the B component by equally applying the spirit of the present invention.

Also, the embodiment described above is applied to a color image including R, G, and B components, however, it can be equally applied to a Y-Cr-Cb or X-Y-Z image.

Figure 2:
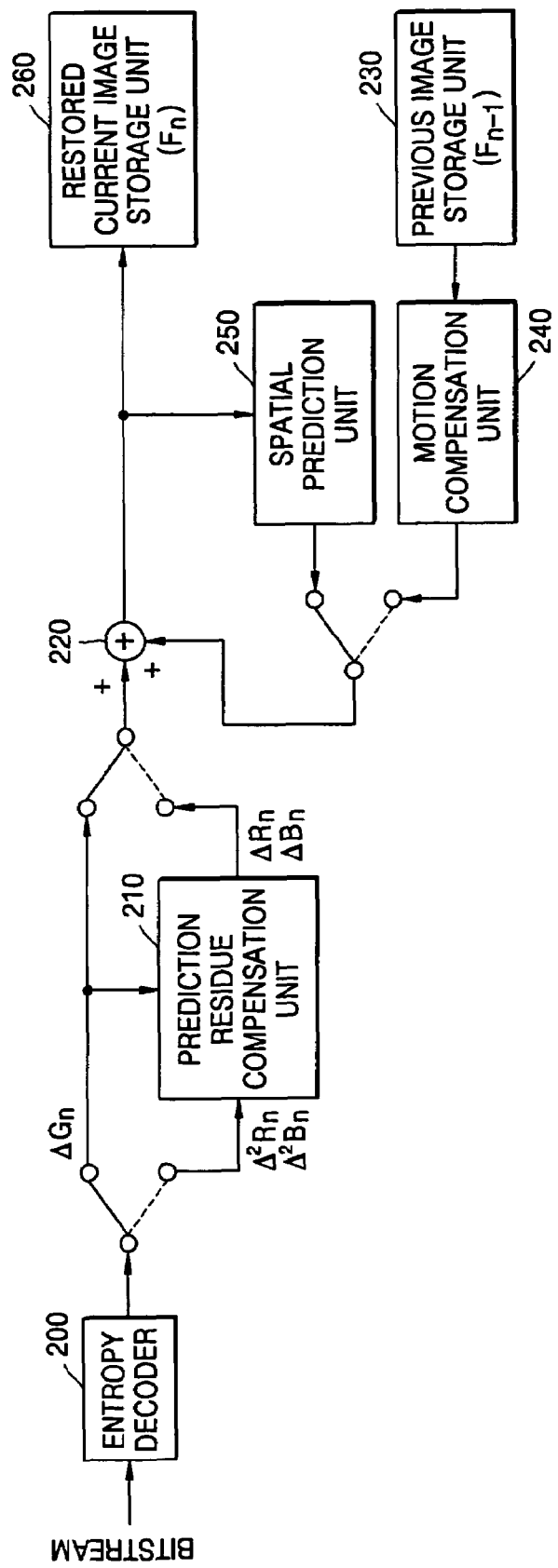
FIG. 2 is a block diagram of a lossless image decoding apparatus, according to an embodiment of the present invention.

FIG. 2 is a block diagram of a lossless image decoding method and apparatus, according to another embodiment of the present invention.

The lossless image decoding method and apparatus restores an image from a bitstream by passing the bitstream through an process opposite to the encoding process of the lossless image encoding method and apparatus described above in FIG. 1.

In FIG. 2, an encoded color R-G-B image is decoded. The lossless image decoding apparatus includes an entropy decoder 200, a prediction residue compensation unit 210, an original image generator 220, a previous image storage unit $F_{n-1}$ 230, a motion compensation unit 240, a spatial prediction unit 250, and a restored current image storage unit $F_n$ 260. Also, the lossless image decoding apparatus can further include a mode determining unit (not shown) determining whether decoding is performed in an inter prediction mode or an intra prediction mode.

The entropy decoder 200 entropy decodes a lossless encoded bitstream, e.g., the bitstream described in FIG. 1. The entropy decoder 200 generates the restored residue of the predictor component defined as the predictor in a prior lossless image encoding apparatus, among the color components, and the restored prediction residues of the components which were not defined as the predictor in the prior lossless image encoding apparatus, among the color components, when decoding a bitstream of encoded color image.

For example, the prediction residue compensation unit 210 will generate restored residues $\Delta B_n$, and $\Delta R_n$ of R-B components by adding prediction residues $\Delta^2 B_n$ and $\Delta^2 R_n$ of R-B components restored by the entropy decoder 200 to a residue value obtained by transforming a residue $\Delta G_n$ of the G component restored by the entropy decoder 200.

The motion compensation unit 240 generates a prediction image obtained by temporally motion compensating a previous image received from the previous image storage unit $F_{n-1}$ 230. The spatial prediction unit 250 generates a prediction image obtained by estimating a prediction direction from spatially adjacent pixels.

The original image generator 220 generates an original image in which a block effect exists by adding the residues $\Delta B_n$ and $\Delta R_n$ of the R-B components restored by the prediction residue compensation unit 210 and the restored residue $\Delta G_n$ of the G component generated by the entropy decoder 200 to the prediction image generated by the motion compensation unit 240 in the inter prediction mode, or generates an original image in which a block effect exists by adding the residues $\Delta B_n$ and $\Delta R_n$ of the R-B components restored by the prediction residue compensation unit 210 and the restored residue $\Delta G_n$ of the G component generated by the entropy decoder 200 to the prediction image generated by the spatial prediction unit 250 in the intra prediction mode. The restored current image storage unit $F_n$ 260 receives the original image in which the block effect exists and stores the received original image as a restored current image.

An operation of the lossless image decoding apparatus will now be described in more detail. The restored residue $\Delta G_n$ of the G component is obtained by passing the lossless encoded bitstream through the entropy decoder 200.

In the case of the inter prediction mode, the restored value of the G component is obtained by adding the restored residue $\Delta G_n$ of the G component to a prediction value obtained by predicting a previous image stored in the previous image storage unit $F_{n-1}$ 230 by the motion compensation unit 240.

In the case of the intra prediction mode, the restored value of the G component is obtained by adding the restored residue $\Delta G_n$ of the G component to a prediction value of a spatially adjacent block generated by the spatial prediction unit 250. The restored value of the G component is stored in the restored current image storage unit $F_n$ 260.

In order to restore the R and B components, the restored prediction residues $\Delta^2 B_n$ and $\Delta^2 R_n$ of the R-B components are generated by entropy decoding the lossless encoded bitstream by the entropy decoder 200. In the prediction residue compensation unit 210, the restored residues $\Delta B_n$ and $\Delta R_n$ of the R-B components are then obtained by adding the restored prediction residues $\Delta^2 B_n$ and $\Delta^2 R_n$ of the R-B components to the restored residue $\Delta G_n$ of the G component.

The restored values of the R-B components are obtained by adding the restored residues $\Delta B_n$ and $\Delta R_n$ of the R-B components to a block value predicted by the motion compensation unit 240 in the inter prediction mode or the spatial estimation unit 250 in the intra prediction mode through the original image generator 220. The restored values of the R-B components are then stored in the restored current image storage unit $F_n$ 260.

In the lossless image decoding method and apparatus using inter-color plane prediction described above, the components are input in order of G, R and B. The residue of the G component is decoded first, then prediction residues of the R-B components are decoded, and the original image is then restored by obtaining the residues of the R-B components using the residue of the G component. However, this decoding method is effective when the G component has most of the image information. Therefore, when the R component makes up most of the image information to be encoded, that is, when the R component is the dominant component, in an embodiment of the present invention, a residue of the R component is obtained, and prediction residues of the G-B components can be obtained using the residue of the R component. Likewise, when the B component is the dominant component, a residue of the B component is obtained, and prediction residues of the R-G components can be obtained using the residue of the B component by equally applying the spirit of the present invention.

Also, the embodiment described above is applied to a color image including R, G, and B components, however, it can be equally applied to a Y-Cr-Cb or X-Y-Z type image.

Figure 3:
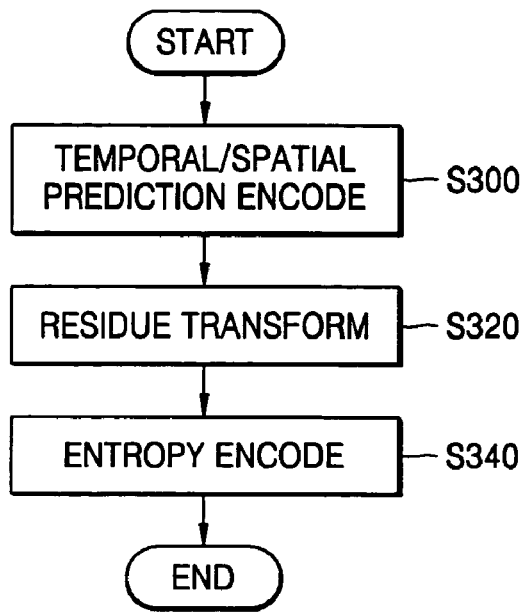
FIG. 3 is a flowchart of a lossless image encoding method, according to an embodiment of the present invention.

FIG. 3 is a flowchart of a lossless image encoding method, according to still another embodiment of the present invention.

Referring to FIG. 3, a residue of a G component of an image is obtained by subtracting a value predicted using a spatially adjacent image or a temporally adjacent image from the G component, similar to a conventional encoder in operation S300.

The residue value of the G component can be represented below in Equation 1.

$$\Delta G = G - G_p \qquad \text{Equation 1}$$

Here, $G_p$ is obtained using the current image storage unit $F_n$ 100 in the intra prediction mode, or using the previous image storage unit $F_{n-1}$ 110 in the inter prediction mode. The residue value of the G component is then entropy encoded. As described above, an operation determining whether a performing mode is an inter prediction mode or an intra prediction mode can also be implemented before operation S300.

Temporal/spatial prediction of the R and B components is performed by the MP image generator 120 and the SP image generator 130 in each color plane, similar the temporal/spatial prediction of the G component in operation S300. Residue values of the R-B components, as prediction results, are represented below in Equation 2 and Equation 3.

$$\Delta R = R - R_p \qquad \text{Equation 2}$$

$$\Delta B = B - B_p \qquad \text{Equation 3}$$

Here, $R_p$ and $B_p$ are the residue values of the R-B components, respectively, predicted using spatially adjacent images stored in the current image storage unit $F_n$ 100 in the intra prediction mode or temporally adjacent images stored in the previous image storage unit $F_{n-1}$ 110 in the inter prediction mode. $R_p$ and $B_p$ are determined in the same color plane. The prediction residues $\Delta^2 B_n$ and $\Delta^2 R_n$ of the R-B components, which are predicted values of the residues $\Delta B_n$ and $\Delta R_n$ of the R-B components calculated, by Equations 2 and 3, once more using a value obtained by linear transforming the residue $\Delta G_n$ of the G component, that is, prediction residues $\Delta^2 B_n$ and $\Delta^2 R_n$ of the R-B components are values predicted between different color planes, once more obtained, as shown in Equation 4 and Equation 5 below, in operation S320.

$$\Delta^2 R = \Delta R - f(\Delta G) = \Delta R - (a \cdot \Delta G + b) \quad \text{Equation 4}$$

$$\Delta^2 B = \Delta B - f(\Delta G) = \Delta B - (c \cdot \Delta G + d) \quad \text{Equation 5}$$

Here, $\Delta R$ and $\Delta B$ are approximated by representing correlations between $\Delta G$ and $\Delta R$ and between $\Delta G$ and $\Delta B$ with a linear function since correlations among $\Delta G$, $\Delta R$, and $\Delta B$ are high. Here, a and b are respectively a slope and a deviation of the linear function approximated when the residue of the R component is predicted using the residue of the G component, and c and d are respectively a slope and a deviation of the linear function approximated when the residue of the B component is predicted using the residue of the G component. The a, b, c, and d can be obtained by using linear regression with $\Delta G$, $\Delta R$, and $\Delta B$ values, as shown below in Equation 6, Equation 7, Equation 8, and Equation 9, respectively.

$$a = \frac{cov(\Delta G, \Delta R)}{\sigma_{\Delta G}^2} \quad \text{Equation 6}$$

$$b = E(\Delta R) - a \cdot E(\Delta G) \quad \text{Equation 7}$$

$$c = \frac{cov(\Delta G, \Delta B)}{\sigma_{\Delta G}^2} \quad \text{Equation 8}$$

$$d = E(\Delta B) - c \cdot E(\Delta G) \quad \text{Equation 9}$$

Here, cov(•) indicates covariance, E(•) indicates average of values, and $\sigma$ indicates variance.

Information duplicated between $\Delta G$, $\Delta R$, and $\Delta B$ can be effectively removed through the prediction processes described above. Here, a predicting method can be differently applied according to corresponding images or systems. In general, since the G component makes up most of the image information in the R-G-B image, in the above embodiment, $\Delta R$ and $\Delta B$ are prediction encoded by generating a predictor, by transforming $\Delta G$ into a linear equation. However, the residue of the R component or the B component can also be the predictor, according to a characteristic of an image. For example, example considerations for determining which component should be the predictor include: using, as a predictor, a component, by which luminance is affected most, among the components; using, as a predictor, a component, whose average value is highest, among the components; or using, as a predictor, a component, by which visual effects of people are affected most, among the components. For example, when a luminance value of an RGB image is calculated, since the luminance value is calculated by Luminance=0.2126R+0.7152G+ 0.0722B in an SMPTE 274M standard, the influence of each of the RGB components affecting the luminance can be calculated. In general, since the G component affects the luminance most, the G component can be set to be the predictor.

Likewise, another image besides the RGB image can be encoded by defining a residue of a component as a predictor and predicting residues of the other components. For example, in a $YC_bC_r$ image, $C_bC_r$ components can be prediction encoded by using a residue of a Y component as a predictor, or since statistical characteristics of the $C_b$ and $C_r$ images are similar, one component can be prediction encoded by using the other component as the predictor.

Likewise, in an XYZ image, residue prediction encoding can be performed using the same method as the RGB or $YC_bC_r$ image. That is, the same method as for the RGB image can be used by substituting the R component for the X component, the G component for the Y component, and the B component for the Z component, and the same method as for the $YC_bC_r$ image can be used by substituting the $C_r$ component for the X component, the Y component for the Y component, and the $C_b$ component for the Z component.

As described above, in a method according to an embodiment of the present invention, after a residue of one component, among residues obtained by performing temporal/spatial prediction in each color plane, is set as a predictor, encoding is performed by predicting residues of the other components. Here, a prediction model can be determined using linear regression as described above. Since this linear regression model can cause different results, according to images, a, b, c, and d can be set to different values for every image. Or, each of a, b, c, and d can be set to a value suitable for various images. To simplify calculation, only integers should be used in the linear regression model. This method can be usefully used for processors, which do not support real number calculation, in particular. A shift operation can be simply used instead of a multiplication or division operation by setting a and c to exponential power values of 2 not to use the multiplication or division operation. Also, a prediction model can be made by setting a=c=1 and b=d=0, as shown in Equation 10 and Equation 11 below.

$$\Delta^2 R = \Delta R - \Delta G \quad \text{Equation 10}$$

$$\Delta^2 B = \Delta B - \Delta G \quad \text{Equation 11}$$

In particular, in an actual image, since strong linear positive correlations exist between $\Delta G$, $\Delta R$, and $\Delta B$ components, and a and c values are almost equal to 1, use of a prediction model like Equation 10 and Equation 11 has advantages in that calculation is simple and performance is similar to that used for the linear regression model.

Finally, prediction residues $\Delta^2 B$ and $\Delta^2 R$ obtained through these processes are generated as a bitstream by the entropy encoder 160 in operation S340.

Figure 4:
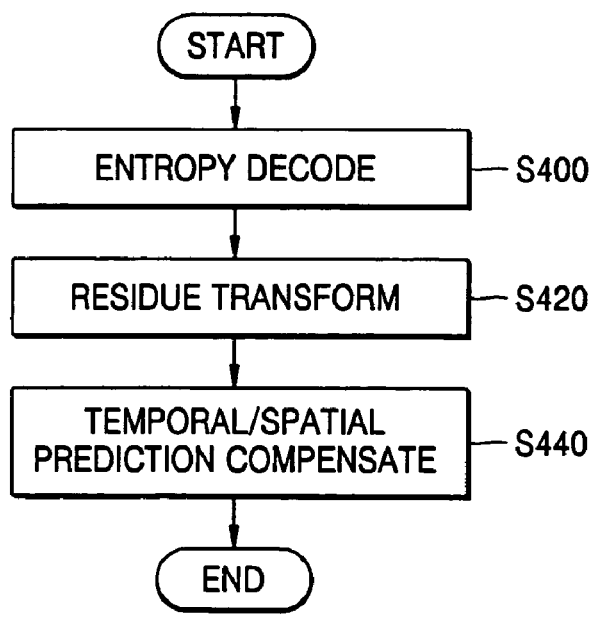
FIG. 4 is a flowchart of a lossless image decoding method, according to an embodiment of the present invention.

FIG. 4 is a flowchart of a lossless image decoding method, according to an embodiment of the present invention. The lossless image decoding method of FIG. 4 is performed by performing a reverse process as performed in the encoding process of the lossless image encoding method of FIG. 3.

Referring to FIG. 4, a lossless encoded bitstream is entropy decoded, in operation S400. Through the entropy decoding, a residue $\Delta G$ of a G component and prediction residues $\Delta^2 B$ and $\Delta^2 R$ of R-B components are obtained.

Residues $\Delta R$ and $\Delta B$ of the R-B components are generated by residue prediction compensating the prediction residues $\Delta^2 B$ and $\Delta^2 R$ of the R-B components, in operation S420.

A G image, an R image, and a B image are restored by temporal/spatial prediction compensating the residue $\Delta G$ of the G component, the residue $\Delta R$ of the R component, and the residue $\Delta B$ of the B component, in operation S440.

With respect to FIG. 4, description of FIG. 3 will be referenced at a level that those skilled in the art, to which the present invention pertains, can easily construe.

FIG. 5 illustrates a method of dividing a macro block for temporal prediction. That is, FIG. 5 shows an example method of dividing an image into predetermined sized blocks to perform temporal prediction of the image, as described above regarding FIG. 1. This method is in accordance with encoding standards such as ISO/IEC 14496-10 2002 and ITU-T Rec H.264. However, different from other methods, a macro block can be divided in blocks of various sized blocks. Basically, a 16×16 macro block is divided into various sizes such as 16×16, 16×8, 8×16, and 8×8, a motion vector of each block is obtained, and a temporal image value is then predicted. Fine motion can be exactly sensed by further dividing an 8×8 block into blocks with various sizes such as 8×8, 8×4, 4×8, and 4×4.

FIG. 6A illustrates positions of adjacent pixels for spatial prediction and pixel positions of a current block to be predicted. That is, FIG. 6A illustrates positions of adjacent pixels for the SP unit 134, illustrated in FIG. 1 and pixel positions of a current block to be predicted. The method used in FIG. 6A example is the same as a method used in standard encoding methods such as ISO/IEC 14496-10 2002 and ITU-T Rec H.264. In FIG. 6A, to predict a 4×4 block data $P_a, P_b, \ldots, P_q$, spatially adjacent data $P_0, P_1, \ldots, P_{12}$, which have been encoded and restored previously, are used.

Figure 6B:
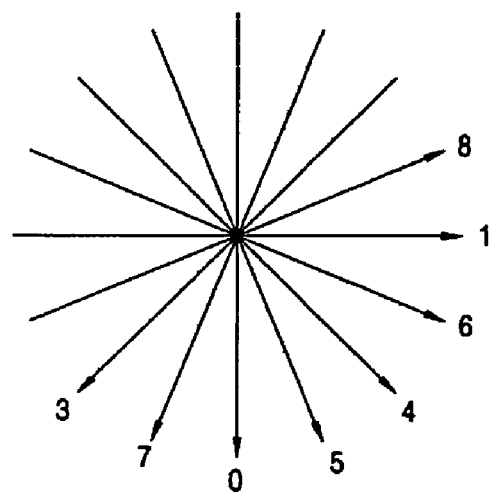
FIG. 6B illustrates 9 predicted directions from 0 to 8 for predicting a current block by projecting on spatially adjacent pixels.

FIG. 6B illustrates an embodiment of 9 predicted directions from 0 to 8 for predicting a current block by projecting on spatially adjacent pixels. For example, in the case of a 0 direction, by projecting adjacent pixel values $P_1, P_2, P_3$, and $P_4$ in the vertical direction, $P_a, P_e, P_i$, and $P_m$ are predicted as $P_1$. $P_b, P_f, P_j$, and $P_n$ are predicted as $P_2$. $P_c, P_g, P_k$, and $P_o$ are predicted as $P_3$. $P_d, P_h, P_l$, and $P_q$ are predicted as $P_4$. Likewise, other directions are also predicted through projection.

Figure 7:
FIG. 7 illustrates R-G-B crew (1280X720) images and residue images obtained by temporal prediction.

FIG. 7 illustrates R-G-B crew (1280X720) images and residue images obtained by temporal prediction.

As illustrated in FIG. 7, similarity among the R-G-B images is low, however, similarity among the residue images is pretty high in most regions. With regard to the residue values generated by the previously described spatial prediction, in relation to FIG. 1, similarity among the R-G-B components is also pretty high.

Figure 8A:
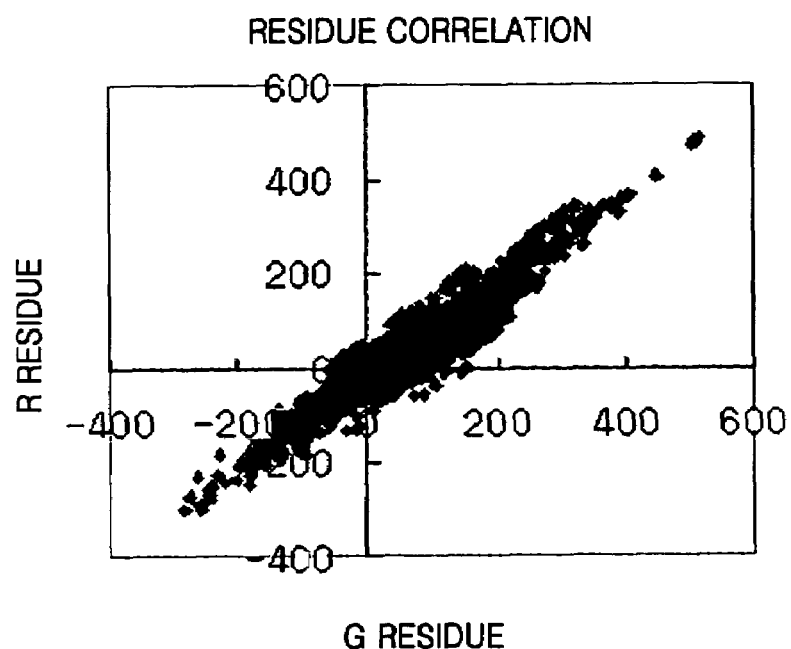
FIG. 8A illustrates correlations between residues obtained by temporal/spatial prediction of R-G color images.

FIG. 8A illustrates a correlation between residues obtained by temporal/spatial prediction of R-G color images. FIG. 8A shows a correlation between residues, with the residue of the G component as the horizontal axis and the residue of the R component as the vertical axis.

Figure 8B:
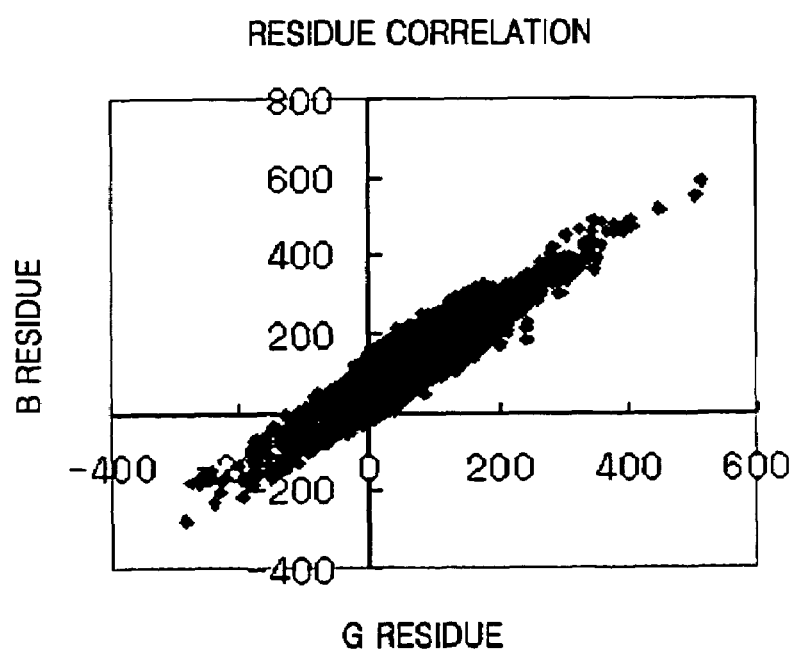
FIG. 8B illustrates correlations between residues obtained by temporal/spatial prediction of G-B color images.

FIG. 8B illustrates correlations between residues obtained by temporal/spatial prediction of G-B color images. FIG. 8B shows a correlation between residues, with the residue of the G component as the horizontal axis and the residue of the B component as the vertical axis.

Referring to FIGS. 8A and 8B, correlations between the residue value of the R or B component and the residue value of the G component is high, and the residues of the R or B component can be predicted by linear regression using the residue of the G component as the predictor.

In a lossless image encoding/decoding apparatus and method, using inter-color plane prediction according to embodiments of the present invention, when a color image is losslessly compressed, more than 50% of the color image can be compressed. In particular, when the performance of the inter-color plane prediction is compared to a process where the inter-color plane prediction is not performed, compression efficiency with the inter-color plane prediction is around 20% higher than when the inter-color plane prediction is not performed.

Table 1 shows experimental data related to the compression efficiency.

TABLE 1

| Bit-depth | Seq. | Bitrate (Mbps) RGB (conventional method) | Bitrate (Mbps) NEW (present invention) | Gain (%) |
|---|---|---|---|---|
| 10 bit | Crew | 1001 | 884 | 13.29 |
|  | Harbour | 1185 | 921 | 28.60 |
| 8 bit | Crew | 625 | 552 | 13.15 |
|  | Harbour | 756 | 602 | 25.50 |

The embodiments described above present cases where the inter prediction mode and the intra prediction mode are used together. However, use of both the inter prediction mode and the intra prediction mode is not necessary, and in these cases implementation of the present invention can be easily understood by those skilled in the art.

Embodiments of the present invention can also be embodied as computer readable codes on a computer readable medium, e.g., computer readable recording media. The computer readable medium can be any data storage device that can store data which can be thereafter read by a computer system. Examples of the computer readable medium include read-only memory (ROM), random-access memory (RAM), CD-ROMs, magnetic tapes, floppy disks, optical data storage devices, wave-guides, and carrier waves (such as data transmission through the Internet). The computer readable medium can also be distributed over network coupled computer systems so that the computer readable code is stored and executed in a distributed fashion.

As described above, embodiments of the present invention relate to a lossless image encoding/decoding method and apparatus using inter-color plane prediction. When a color image is compressed, since temporal/spatial prediction encoding in a color plane is performed in the above embodiments with respect to each color image component and two residues are prediction encoded by using a value obtained as a result of a temporal/spatial prediction encoding as a residue of the color plane, compression efficiency can be improved, thereby removing duplicate information inside each color plane component and duplicate information between the color plane components. Likewise, since a high quality image can be stored, as it is, by losslessly compressing the color image, the present invention is suitable at least for applications in digital film storage, medical pictures, and satellite geographical information pictures requiring precise image processing.

Also, since there is no quality loss in a picture generated by directly encoding in an R-G-B image, without transforming it into a Y-Cr-Cb image, high quality image information can be obtained.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A lossless image encoding apparatus, which losslessly encodes a color image using residue prediction between different color image components, the apparatus comprising:

a motion prediction image generator estimating motion between a previous image and a current image in units of predetermined sized blocks and outputting a prediction image;

a residue generator generating a temporal residue corresponding to a difference between the prediction image and a corresponding block of the current image with respect to different components of the current image;

a prediction residue generator generating prediction residues by defining a linear-transformed value of one residue, of the different components, output from the residue generator as a predictor residue and using respective differences between residues of other components, of the different components, and the predictor residue; and an entropy encoder receiving the predictor residue and prediction residues and generating a bitstream by entropy encoding the predictor residue and the prediction residues.

2. The apparatus of claim 1, wherein the motion prediction image generator comprises:

a motion estimation unit estimating motion between the current image and the previous image in units of predetermined sized blocks; and a motion prediction unit outputting a block corresponding to a motion vector generated by the motion estimation unit.

3. The apparatus of claim 1, wherein the prediction residue generator defines the predictor residue using a dominant residue of a component, of the different components, which affects luminance the most among all components of the current image, and generates prediction residues using differences between residues of all the components, other than the dominant residue, and the predictor residue.

4. The apparatus of claim 1, wherein, when the current image is an RGB image, the prediction residue generator defines the predictor residue as a residue of a G component and generates the prediction residues based on differences between residues of R-B components and the predictor residue.

5. The apparatus of claim 4, wherein the prediction residue generator generates the predictor residue using a linear function obtained by multiplying the residue of the G component by a predetermined value and adding an offset to the multiplied G component residue in order to predict the residues of the R-B components using the G component residue, and the linear function is based on differently calculated block sizes used when a motion is compensated in units of blocks from the previous image.

6. The apparatus of claim 4, wherein, when the current image is an XYZ image, the prediction residue generator generates the predictor residue and prediction residues of X, Y, and Z components corresponding to the generation of the predictor residue and the prediction residues for the RGB image.

7. The apparatus of claim 1, wherein, when the current image is a $YC_bC_r$ image, the prediction residue generator defines the predictor residue as a residue of a Y component and generates prediction residues using differences between residues of $C_b$-$C_r$ components and the predictor residue.

8. The apparatus of claim 7, wherein the prediction residue generator generates the predictor residue using a linear function obtained by multiplying the residue of the Y component by a predetermined value and adding an offset to the multiplied Y component residue in order to predict the residues of the $C_b$-$C_r$ components using the Y component residue, and the linear function is based on differently calculated block sizes used when a motion is compensated in units of blocks from the previous image.

9. The apparatus of claim 7, wherein, when the current image is an XYZ image, the prediction residue generator generates a predictor residue and prediction residues of X, Y, and Z components corresponding to the generation of the predictor residue and the prediction residues for the $YC_bC_r$ image.

10. A lossless image encoding apparatus, which losslessly encodes a color image using residue prediction between different color image components, the apparatus comprising:

a spatial prediction image generator estimating a prediction direction from pixels spatially close to a pixel block of a current image and outputting a prediction image;

a residue generator generating a spatial residue corresponding to a difference between the prediction image and the pixel block of the current image with respect to each of different components of the current image;

a prediction residue generator generating prediction residues by defining a linear-transformed value of one residue, of the different components, output from the residue generator as a predictor residue and using respective differences between residues of other components, of the different components, and the predictor residue; and an entropy encoder receiving the predictor residue and the prediction residues and generating a bitstream by entropy encoding the predictor residue and the prediction residues.

11. The apparatus of claim 10, wherein the spatial prediction image generator comprises:

a spatial estimation unit estimating the prediction direction from pixels spatially close to the pixel block of the current image; and a spatial prediction unit outputting a block corresponding to the direction predicted by the spatial estimation unit.

12. The apparatus of claim 10, wherein the prediction residue generator defines the predictor residue using a dominant residue of a component, of the different components, which affects luminance the most among all components of the current image, and generates prediction residues using differences between residues of all the components, other than the dominant residue, and the predictor residue.

13. The apparatus of claim 10, wherein, when the current image is an RGB image, the prediction residue generator defines the predictor residue as a residue of a G component and generates the prediction residues based on differences between residues of R-B components and the predictor residue.

14. The apparatus of claim 13, wherein the prediction residue generator generates the predictor residue using a linear function obtained by multiplying the residue of the G component by a predetermined value and adding an offset to the multiplied G component residue value in order to predict the residues of the R-B components using the G component residue, and the linear function is based on differently calculated block sizes used when a motion is compensated in units of blocks from the previous image.

15. The apparatus of claim 13, wherein, when the color image is an XYZ image, the prediction residue generator generates a predictor residue and prediction residues of X, Y, and Z components corresponding to the generation of the predictor residue and the prediction residues for the RGB image.

16. The apparatus of claim 10, wherein, when the current image is a $YC_bC_r$ image, the prediction residue generator defines the predictor residue as a residue of a Y component and generates prediction residues by predicting residues of $C_b$-$C_r$ components.

17. The apparatus of claim 16, wherein the prediction residue generator generates the predictor residue using a linear function obtained by multiplying the residue of the Y component by a predetermined value and adding an offset to the multiplied Y component residue in order to predict the residues of the $C_b$-$C_r$ components using the Y component residue, and the linear function is based on differently calculated block sizes used when a motion is compensated in units of blocks from a previous image.

18. The apparatus of claim 16, wherein, when the current image is an XYZ image, the prediction residue generator generates a predictor residue and prediction residues of X, Y, and Z components corresponding to the generation of the predictor residue and the prediction residues for the $YC_bC_r$ image.

19. A lossless image encoding apparatus, which losslessly encodes a color image using residue prediction between different color image components, the apparatus comprising:
a motion prediction image generator estimating motion between a previous image and a current image in units of predetermined sized blocks and outputting a first prediction image;
a spatial prediction image generator estimating a prediction direction from pixels spatially close to a pixel block of the current image and outputting a second prediction image;
a residue generator generating a temporal residue corresponding to a difference between the first prediction image generated by the motion prediction image generator and a corresponding block of the current image in an inter prediction mode, or generating a spatial residue corresponding to a difference between the second prediction image generated by the spatial prediction image generator and the pixel block of the current image in an intra prediction mode;
a prediction residue generator receiving the temporal residue in the inter prediction mode or the spatial residue in the intra prediction mode from the residue generator and generating prediction residues by defining a linear-transformed value of one residue for a component, of different components of the current image, as a predictor residue and using respective differences between residues of other components, of the different components, and the predictor residue; and
an entropy encoder receiving the predictor residue and the prediction residues and generating a bitstream by entropy encoding the predictor residue and the prediction residues.

20. A lossless image encoding method, which losslessly encodes a color image using residue prediction between different color image components, the method comprising:
estimating motion between a previous image and a current image in units of predetermined sized blocks and outputting a prediction image;
generating a temporal residue corresponding to a difference between the prediction image and a corresponding block of the current image with respect to different components of the current image;
generating prediction residues by defining a linear-transformed value of one residue, of the different components, output from the generating of the temporal residue, as a predictor residue and using respective differences between temporal residues of other components, of the different components, and the predictor residue; and
generating a bitstream by entropy encoding the predictor residue and the generated prediction residues of the other components.

21. The method of claim 20, wherein the generating of the prediction residues comprises:
defining the predictor residue as a residue of a component of the current image that affects luminance the most among the different components of the current image; and
generating prediction residues by predicting temporal residues of the other components.

22. The method of claim 20, wherein, when the current image is an RGB image, the generating of the prediction residues comprises:
defining the predictor residue as a residue of a G component of the current image; and
generating prediction residues by predicting residues of R-B components.

23. The method of claim 22, wherein, when the current image is an XYZ image, the generating of the prediction residues comprises:
generating a predictor residue and prediction residues for X, Y, and Z components corresponding to the generation of the predictor residue and prediction residues of the RGB image.

24. The method of claim 20, wherein, when the current image is a $YC_bC_r$ image, the generating of the prediction residues comprises:
defining the predictor residue as a residue of a Y component; and
generating prediction residues by predicting residues of $C_b$-$C_r$ components.

25. The method of claim 24, wherein, when the current image is an XYZ image, the generating of the prediction residues comprises:
generating a predictor residue and prediction residues for X, Y, and Z components corresponding to the generation of the predictor residue and prediction residues of the $YC_bC_r$ image.

26. A lossless image encoding method, which losslessly encodes a color image using residue prediction between different color image components, the method comprising:
estimating a prediction direction from pixels spatially close to a pixel block of a current image and outputting a prediction image;
generating a spatial residue corresponding to a difference between the prediction image and the pixel block of the current image with respect to different components of the current image;
generating prediction residues by defining a linear-transformed value of one residue, of the different components, output from the generating of the spatial residue, as a predictor residue and using respective differences between temporal residues of other components, of the different components, and the predictor residue; and
generating a bitstream by entropy encoding the predictor residue and the prediction residues of the other components.

27. The method of claim 26, wherein the generating of the prediction residues comprises:

defining the predictor residue as a residue of a component of the current image that affects luminance the most among the different components of the current image; and generating prediction residues by predicting temporal residues of the other components.

28. The method of claim 26, wherein, when the current image is an RGB image, the generating of the prediction residues comprises:

defining the predictor residue as a residue of a G component of the current image; and generating prediction residues by predicting residues of R-B components.

29. The method of claim 28, wherein, in a case where the current image is an XYZ image, the generating of the prediction residues comprises:

generating a predictor residue and prediction residues for X, Y, and Z components corresponding to the generation of the predictor residue and prediction residues of the RGB image.

30. The method of claim 26, wherein, in a case where the current image is a $YC_bC_r$ image, the generating of the prediction residues comprises:

defining the predictor residue as a residue of a Y component of the current image; and generating prediction residues by predicting residues of $C_b$-$C_r$ components.

31. The method of claim 30, wherein, in a case where the current image is an XYZ image, the generating of the prediction residues comprises:

generating a predictor residue and prediction residues for X, Y, and Z components corresponding to the generation of the predictor residue and prediction residues of the $YC_bC_r$ image.

32. A lossless image encoding method, which losslessly encodes a color image using residue prediction between different color image components, the method comprising:

determining whether an encoding mode is an inter prediction mode or an intra prediction mode;

if the encoding mode is determined to be an inter prediction mode, then estimating a motion between a previous image and a current image in units of predetermined sized blocks and outputting a first prediction image, generating a temporal residue corresponding to a difference between the first prediction image and a corresponding block of the current image with respect to different components of the current image, first generating first prediction residues by defining a first linear-transformed value of a first residue, of the different components, output from the generating of the temporal residue, as a predictor residue and using respective differences between temporal residues of other components, of the different components, and the predictor residue, and firstly generating a bitstream by entropy encoding the predictor residue and the first prediction residues of the other components; and if it is determined that the encoding mode is an intra prediction mode, estimating a prediction direction from pixels spatially close to a pixel block of the current image and outputting a second prediction image, generating a spatial residue corresponding to a difference between the second prediction image and the pixel block of the current image with respect to different components of the current image, secondly generating second prediction residues by defining a second linear-transformed value of a second residue, of the different components, output from the generating of the spatial residue, as the predictor residue and using respective differences between temporal residues of other components, of the different components, and the predictor residue, and secondly generating a bitstream by entropy encoding the predictor residue and the second prediction residues of the other components.

33. A lossless image decoding apparatus, which decodes a losslessly encoded color image, the apparatus comprising:

a motion compensation unit generating a temporally motion compensated prediction image;

an entropy decoder generating a restored predictor residue of a predictor component, from different components of the encoded color image, defined as a predictor residue at an upstream corresponding lossless image encoding apparatus, and restored prediction residues of other components, of the different components and different from the predictor component, when decoding a bitstream of the encoded color image;

a prediction residue compensation unit generating restored residues for the other components by adding the restored prediction residues to a value that is acquired by a linear-transform of the restored predictor residue; and an original image generator generating an original image by adding the temporally motion compensated prediction image to the restored residues of the other components and the restored predictor residue of the predictor component.

34. The apparatus of claim 33, wherein the linear transformation uses correlations between the different components of the encoded color image.

35. The apparatus of claim 34, wherein the linear transformation is a linear function obtained by multiplying the restored predictor residue by a predetermined value and adding an offset to the multiplied restored predictor residue, and the linear function differently calculates block sizes used when motion is compensated in units of blocks from a previous image.

36. The apparatus of claim 33, wherein the encoded color image is one of an RGB image, a $YC_bC_r$ image, and an XYZ image.

37. A lossless image decoding apparatus, which decodes a losslessly encoded color image, the apparatus comprising:

a spatial prediction unit generating a prediction image obtained by estimating a prediction direction from spatially adjacent pixels;

an entropy decoder generating a restored predictor residue of a predictor component, from different components of the encoded color image, defined as a predictor residue at an upstream corresponding lossless image encoding apparatus, and restored prediction residues of the other components, of the different components and different from the predictor component, when decoding a bitstream of the encoded color image;

a prediction residue compensation unit generating restored residues for the other components by adding the restored prediction residues to a value that is acquired by a linear-transform of the restored predictor residue; and an original image generator generating an original image by adding the prediction image to the restored residues of the other components and the restored predictor residue of the predictor component.

38. The apparatus of claim 37, wherein the linear transformation uses correlations between the different components of the encoded color image.

39. The apparatus of claim 38, wherein the linear transformation is a linear function obtained by multiplying the restored predictor residue by a predetermined value and adding an offset to the multiplied restored predictor residue, and the linear function differently calculates block sizes used when motion is compensated in units of blocks from a previous image.

40. The apparatus of claim 37, wherein the encoded color image is one of an RGB image, a $YC_bC_r$ image, and an XYZ image.

41. A lossless image decoding apparatus, which decodes a losslessly encoded color image, the apparatus comprising:
a spatial prediction unit generating a prediction image obtained by estimating a prediction direction from spatially adjacent pixels;
a motion compensation unit generating a temporally motion compensated prediction image;
an entropy decoder generating a restored predictor residue of a predictor component, from different components of the encoded color image, defined as a predictor residue at an upstream corresponding lossless image encoding apparatus, and restored prediction residues of other components, of the different components and different from the predictor component, when decoding a bitstream of the encoded color image;
a prediction residue compensation unit generating restored residues of the other components by adding the restored prediction residues to a value that is acquired by a linear-transform of the restored predictor residue; and
an original image generator generating an original image by adding the restored residues of the other components and the restored predictor residue to the temporally motion compensated prediction image generated by the motion compensation unit in an inter prediction mode or to the prediction image generated by the spatial prediction unit in an intra prediction mode.

42. A lossless image decoding method, the method comprising:
generating a temporally motion compensated prediction image;
generating a restored predictor residue of a predictor component, from different components of an encoded color image, and restored prediction residues of other components, of the different components and different from the predictor component, when decoding a bitstream of the encoded color image;
linear-transforming the restored predictor residue;
generating restored residues of the other components, by adding the restored prediction residues of the other components to an output value of the linear-transforming of the restored predictor residue; and
generating an original image by adding the temporally motion compensated prediction image to the restored residues of the other components and the restored predictor residue.

43. The method of claim 42, wherein, the linear-transforming of the restored predictor residue uses correlations between the different components of the encoded color image.

44. The method of claim 43, wherein, the linear-transforming of the restored predictor residue includes applying a linear function obtained by multiplying the restored predictor residue by a predetermined value and adding an offset to the multiplied restored predictor residue, and
the linear function is based on differently calculated block sizes used when a motion is compensated in units of blocks from a previous image.

45. The method of claim 42, wherein the encoded color image is one of an RGB image, a $YC_bC_r$ image, and an XYZ image.

46. A lossless image decoding method, which decodes a losslessly encoded color image, the method comprising:
generating a prediction image obtained by estimating a prediction direction from spatially adjacent pixels;
generating a restored predictor residue of a predictor component, from different components of an encoded color image, and restored prediction residues of other components, of the different components and different from the predictor component, when decoding a bitstream of the encoded color image;
linear-transforming the restored predictor residue;
generating restored residues of the other components, by adding the restored prediction residues of the other components to an output value of the linear-transforming of the restored predictor residue; and
generating an original image by adding the prediction image to the restored residues of the other components and the restored predictor residue.

47. The method of claim 46, wherein the linear-transforming of the restored predictor residue uses correlations between the different components of the encoded color image.

48. The method of claim 47, wherein the linear-transforming of the restored predictor residue includes applying a linear function obtained by multiplying the restored predictor residue by a predetermined value and adding an offset to the multiplied restored predictor residue, and
the linear function is based on differently calculated block sizes used when a motion is compensated in units of blocks from a previous image.

49. The method of claim 46, wherein the encoded color image is one of an RGB image, a $YC_bC_r$ image, and an XYZ image.

50. A lossless image decoding method, the method comprising:
determining whether an encoding mode for an encoded color image is an inter prediction mode or an intra prediction mode;
if the encoding mode is determined to be an inter prediction mode,
generating a temporally motion compensated prediction image,
firstly generating a restored predictor residue of a predictor component, from different components of the encoded color image, and restored prediction residues of other components, of the different components and different from the predictor component, when decoding a bitstream of the encoded color image,
firstly linear-transforming the restored predictor residue,
firstly generating first restored residues of the other components, by adding the restored prediction residues of the other components to an output value of the first linear-transforming of the restored predictor residue, and firstly generating an original image by adding the temporally motion compensated prediction image to the first restored residues of the other components and the restored predictor residue; and if the encoding mode is determined to be an intra prediction mode, generating a prediction image obtained by estimating a prediction direction from spatially adjacent pixels, secondly generating the restored predictor residue of the predictor component and restored prediction residues of the other components, when decoding a bitstream of the encoded color image, secondly linear-transforming the restored predictor residue, secondly generating second restored residues of the other components, by adding the restored prediction residues of the other components to an output value of the secondly linear-transforming of the restored predictor residue, and secondly generating the original image by adding the prediction image to the second restored residues generated in the secondly generating of the second restored residues of the other components and the restored predictor residue generated in the secondly generating of the restored residue.

51. A computer readable medium comprising computer readable code for performing the method of claim 20.

52. A computer readable medium comprising computer readable code for performing the method of claim 26.

53. A computer readable medium comprising computer readable code for performing the method of claim 32.

54. A computer readable medium comprising computer readable code for performing the method of claim 42.

55. A computer readable medium comprising computer readable code for performing the method of claim 46.

56. A computer readable medium comprising computer readable code for performing the method of claim 50.

* * * * *

UNITED STATES PATENT AND TRADEMARK OFFICE
CERTIFICATE OF CORRECTION

| | |
|---|---|
| PATENT NO. | : 7,333,544 B2 |
| APPLICATION NO. | : 10/892248 |
| DATED | : February 19, 2008 |
| INVENTOR(S) | : Woo-shik Kim et al. |

It is certified that error appears in the above-identified patent and that said Letters Patent is hereby corrected as shown below:

Title Page, Column 2 (Other Publications), Line 1, change ""Lossess" to --"Lossless--.

Column 18, Line 39, change "$C_b$-$C_r$," to --$C_b$-$C_r$--.

Column 20, Line 46, change "$YC_bC_r$," to --$YC_bC_r$--.

Signed and Sealed this

Twenty-second Day of July, 2008

JON W. DUDAS
*Director of the United States Patent and Trademark Office*